US009110493B2

(12) United States Patent
Legler et al.

(10) Patent No.: US 9,110,493 B2
(45) Date of Patent: Aug. 18, 2015

(54) CLUTCH BRAKE WARNING INDICATOR

(71) Applicants: Edward P. Legler, Denton, TX (US); Steven Karl Jahns, Bellingham, WA (US); Ingemar Melander, Mullsjö (SE); Per Olof Henriksson, Habo (SE)

(72) Inventors: Edward P. Legler, Denton, TX (US); Steven Karl Jahns, Bellingham, WA (US); Ingemar Melander, Mullsjö (SE); Per Olof Henriksson, Habo (SE)

(73) Assignee: PACCAR Inc, Bellevue, WA (US)

( * ) Notice: Subject to any disclaimer, the term of this patent is extended or adjusted under 35 U.S.C. 154(b) by 58 days.

(21) Appl. No.: 13/787,195

(22) Filed: Mar. 6, 2013

(65) Prior Publication Data

US 2014/0251065 A1 Sep. 11, 2014

(51) Int. Cl.

| | |
|---|---|
| ***F16D 67/02*** | (2006.01) |
| ***G05G 1/44*** | (2008.04) |
| ***G05G 5/03*** | (2008.04) |

(52) U.S. Cl.

CPC .. *G05G 1/44* (2013.01); *G05G 5/03* (2013.01); *Y10T 74/20528* (2013.01)

(58) Field of Classification Search

CPC .................................. G05G 1/44; G05G 5/03

USPC ................ 192/21.5, 30 W, 91 A, 12 R, 18 R; 340/426.32

See application file for complete search history.

(56) References Cited

U.S. PATENT DOCUMENTS

| | | | | |
|---|---|---|---|---|
| 2,941,639 | A | 6/1960 | Christenson | |
| 3,516,526 | A | 6/1970 | Seesselberg | |
| 3,709,344 | A | 1/1973 | Sieren | |
| 4,284,309 | A | 8/1981 | Hoefer | |
| 4,301,713 | A | 11/1981 | Cobb | |
| 4,372,408 | A | 2/1983 | Chatterjea | |
| 4,848,531 | A | 7/1989 | Gray | |
| 5,937,897 | A | 8/1999 | Chatterjea | |
| 6,422,941 | B1 | 7/2002 | Thorner | |
| 6,569,058 | B2 | 5/2003 | Presley | |
| 7,401,865 | B2 | 7/2008 | Shaw | |
| 7,641,032 | B2 | 1/2010 | Kummer | |
| 7,832,535 | B2 * | 11/2010 | Kummer et al. | 192/13 R |
| 8,240,230 | B2 * | 8/2012 | Peniston et al. | 74/512 |
| 2004/0046652 | A1 * | 3/2004 | Yokoyama et al. | 340/454 |
| 2005/0237175 | A1 * | 10/2005 | Paulson et al. | 340/479 |
| 2006/0197374 | A1 | 9/2006 | Jez | |
| 2009/0270223 | A1 | 10/2009 | Cook | |
| 2010/0200351 | A1 | 8/2010 | Boese | |

FOREIGN PATENT DOCUMENTS

CN 101074709 A 11/2007

OTHER PUBLICATIONS

"CBPC-3590: Clutch-Brake Positioning Controller P-291-1: Service & Installation Instructions 819-0526," Warner Electric, South Beloit, Illinois, Sep. 2007, 22 pages.

* cited by examiner

*Primary Examiner* — David J Hlavka

(74) *Attorney, Agent, or Firm* — Christensen O'Connor Johnson Kindness PLLC

(57) ABSTRACT

A device, sometimes referred to as a clutch brake warning indicator, that provides feedback, which may be tactile, audible or visual, to the vehicle operator as the clutch pedal is nearing the point of its stroke where the clutch brake will be engaged. In use, the feedback clutch brake warning indicator will assist the driver against applying the clutch brake during shifting operations, which can cause severe damage to the clutch.

12 Claims, 6 Drawing Sheets

CLUTCH BRAKE WARNING INDICATOR

BACKGROUND

Commercial vehicles, such as Class 8 trucks, typically employ a non-synchronous transmission to transmit torque generated by the engine to the vehicle's drive wheels. A non-synchronous transmission is a form of manual transmission based on gears that do not use sychronizing mechanisms or devices, referred to as dog clutches, cone clutches, dog collars, locking rings, etc., to assist in the meshing of gears when changing gears. Because the gear boxes are engineered without sychronizing mechanisms or devices, the non-synchronous transmission requires an understanding of gear range, torque, engine power, range selectors, multi-functional clutches, and shifter functions. Shifting involves techniques known as "double clutching" and "float-shifting."

Non-synchronous transmissions are typically paired with a driver-operated clutch and a movable shift lever for selecting a reverse gear and a number of forward gears. To shift the transmission from one forward gear to another forward gear, the operator "floats" the transmission in and out of gear by either dis-engaging the clutch (i.e., separating the clutch plates from the flywheel) by pressing the clutch pedal only approximately half way to the floor or speed matching the engine speed and the output shaft speed in a technique known as "float shifting."

Non-synchronous transmissions often have a mechanism for slowing down or stopping the input shaft and/or idle gears from turning to allow initial forward or reverse gear engagement. In commercial motor vehicles, this mechanism is called a clutch brake. The clutch brake is typically a circular disc with a friction surface that is splined to the input shaft of the transmission between the release or throw-out bearing and a transmission cap or brake surface, and is engaged by depressing the clutch all the way to the floor. The clutch brake is only intended to be used when engaging the transmission from a standstill, either shifting the vehicle into reverse or one of the starting gears, such as 1st gear. In some instances, the clutch brake can prevent shifting into gear until the clutch is lifted a few inches off the floor. Moreover, engaging the clutch brake while the vehicle and the transmission gears are moving can cause severe damage to the clutch.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, an apparatus is provided, comprising a clutch pedal movable between a selected range of motion. In some embodiments, the range of motion comprises a clutch brake engaged phase and a non-clutch brake engaged phase, wherein the neutral phase includes a clutch brake warning range. The apparatus also includes a feedback generator associated with clutch pedal motion. In some embodiments, the feedback generator is configured to generate a feedback signal when the clutch pedal is in the clutch brake warning range.

In accordance with another aspect of the present disclosure an apparatus is provided, comprising a clutch brake having an engaged position and an non-engaged position and a clutch pedal movable between a range of motion. In some embodiments, the range of motion comprises a clutch brake engaged range, wherein the clutch brake is in the engaged position, and a clutch brake non-engaged range wherein the clutch brake is in the non-engaged position. In some embodiments, the clutch brake non-engaged range includes a clutch brake warning range. The apparatus also includes a clutch brake warning indicator associated with clutch pedal movement. In some embodiments, the clutch brake warning indicator is configured to warn a vehicle driver when the clutch pedal moves into the clutch brake warning range.

In accordance with yet another aspect of the present disclosure, a clutch brake warning system is provided. The system includes a clutch brake having an engaged position and an non-engaged position and a clutch pedal movable between a selected range of motion. In some embodiments, the range of motion comprising a clutch brake engaged phase and a non-clutch brake engaged phase, wherein the neutral phase includes a clutch brake warning range. The system also includes a clutch brake warning indicator associated with clutch pedal motion. In some embodiments, the clutch brake warning indicator is configured to indicate to a vehicle driver when the clutch pedal is in the clutch brake warning range.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following description sets forth one or more examples of a clutch brake warning indicator for use with a clutch brake. In short, embodiments described herein include a device that provides feedback, which may be tactile, audible or visual, to the vehicle operator as the clutch pedal is nearing the point of its stroke where the clutch brake will be engaged. In use, the clutch brake warning indicator will assist the driver against applying the clutch brake during shifting operations, which can cause severe damage to the clutch.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

Figure 1:
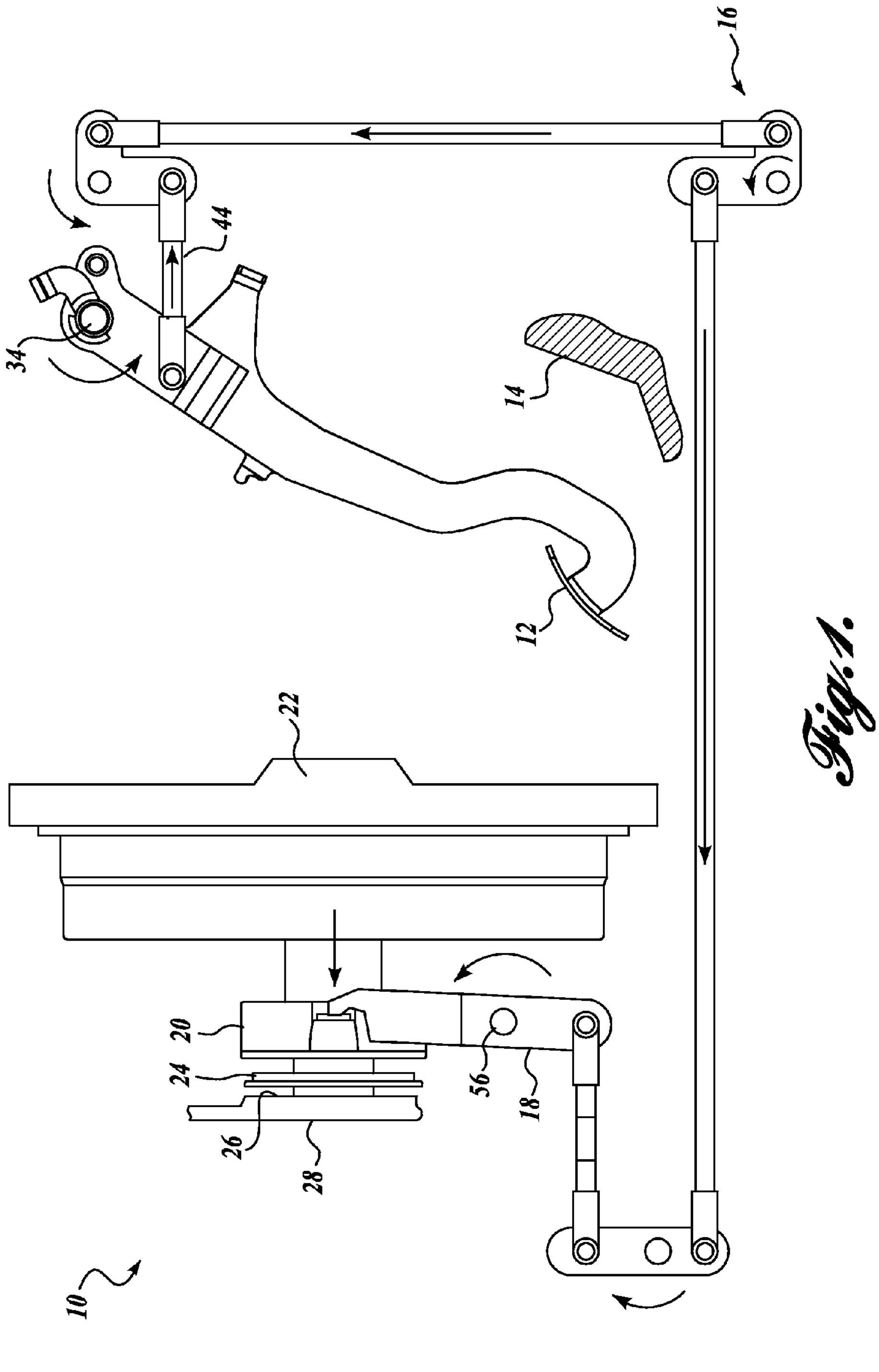
FIG. 1 is a schematic diagram of one example of a clutch system in accordance with aspects of the present disclosure.

FIG. 1 illustrates one example of clutch system 10 for a non-synchronized transmission. A clutch pedal 12 is shown in conjunction with a portion of a truck cab floor 14 toward which the clutch pedal 12 is moved to disengage the clutch. A clutch release linkage 16 is diagrammatically shown to include a plurality of links and mechanical pivots. The clutch release linkage 16 transfers movement of the clutch pedal 12 to a clutch release arm 18, which in turn, transfers movement to a clutch release bearing 20. The clutch release bearing 20 is disposed between an engine 22 that provides torque and an input shaft clutch brake 24. The input shaft clutch brake 24 engages a bearing cap 26 of a transmission 28 to apply a braking force to the input shaft. The input shaft clutch brake 24 is configured to stop rotation of the input shaft of the transmission 28 particularly when it is desired to shift the transmission between forward and reverse.

In clutch systems for non-synchronized transmissions, the clutch brake 24 may be keyed to the transmission input shaft between the release bearing 20 and the bearing cap 26. When the clutch is disengaged, the release bearing 20 disengages the driven disk or flywheel (i.e., part of the engine 22) and clamps the clutch brake 24 against, for example, the transmission bearing cap 26, causing the input shaft to slow until it stops rotating. As a result, gears in the non-synchronized transmission are allowed to be changed without causing gear clash/damage and facilitating shifting into a new gear range.

The clutch system 10 shown in FIG. 1 is of the "pull-type." It will be appreciated that aspects of the present disclosure may also be practiced with clutch systems of the "push-type." The clutch system 10 briefly described above employs a mechanical linkage, described as clutch release linkage 16, that transmits motion of the clutch pedal 12 to the clutch release arm 18, and in turn, to the clutch release bearing 20 and clutch brake mechanism. It will be appreciated that at least some of the mechanical linkage can be replaced by pneumatic or hydraulic systems in order to transmit the motion of the clutch pedal 12 to the clutch release arm 18. One such arrangement is shown in FIG. 2.

Figure 2:
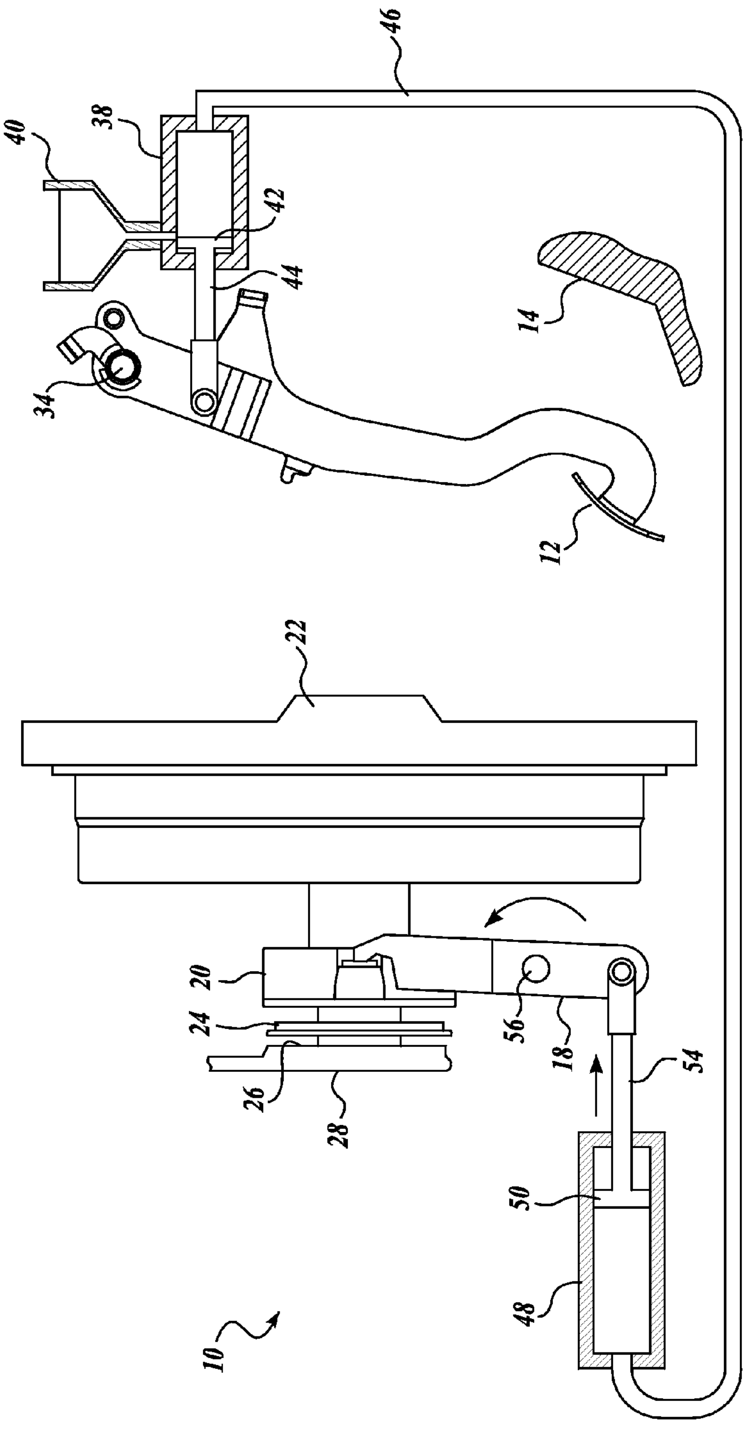
FIG. 2 is a schematic diagram of another example of a clutch system in accordance with aspects of the present disclosure.

Referring now to FIG. 2, another example of clutch system 10 is shown. The clutch system 10 includes a clutch pedal 12 that is pivoted about a pedal arm pivot 34 toward and away from a cab floor 14. A master cylinder 38 is provided with hydraulic fluid from a hydraulic fluid supply 40. The master cylinder 38 includes a piston 42 and a rod 44. The clutch pedal 12 is connected to one end of the rod 44. When the clutch pedal 12 is depressed the rod 44 is shifted causing the piston 42 to move. Hydraulic fluid communicates through a hydraulic line 46 to a slave cylinder 48. Slave cylinder 48 includes a piston 50 and a rod 54. The rod 54 is connected to the clutch release arm 18, which is pivotable about a release arm pivot 56. The clutch release arm 18 engages the conventional clutch release bearing 20 to engage and disengage the clutch.

It will be further appreciated that the clutch brake can be activated without a direct linkage to the clutch pedal, also referred to as external activation clutch brake. In that regard, external activation clutch brakes of the pneumatic, hydraulic, or electric type may be practiced with embodiments of the present disclosure. In some embodiments, an external activation clutch brake may be actuated by a simple switch. In such embodiment, the switch can be located at various positions in the clutch release linkage or on the transmission and can be activated when the clutch pedal obtains a predetermined depressed position. The output of such a switch may be combined with other vehicle switch outputs for controlling the input shaft or clutch brake.

The clamping action of the release bearing 20, the clutch brake 24 and the transmission bearing cap 26 causes an increase in the load required to depress the clutch pedal 12 near the bottom of the pedal stroke. A driver can typically feel this increase in load, which indicates the clutch brake 24 has been engaged. This increased load phenomenon is known in the art as "clutch brake squeeze." Drivers are familiar with the feel of a clutch pedal 12 as it provides clutch brake squeeze and react to clutch brake squeeze by shifting the transmission into reverse or first gear only after such feedback is felt.

However, switching gears or placing the transmission into gear without engaging the clutch brake while the vehicle and the transmission gears are moving can cause severe damage to the clutch system 10. In that regard, and in accordance with aspects of the present disclosure, clutch brake warning indicators, or feedback generators, formed in accordance with embodiments of the present disclosure are provided in order to provide feedback or indicate to the driver that the position of the clutch pedal is such that the clutch brake is about to be activated. Accordingly, the driver can interpret the feedback or indication from the clutch brake warning indicators and respond with corrective action, if needed, in order to retard any application of the clutch brake while the vehicle or transmission gears are moving.

Figure 6:
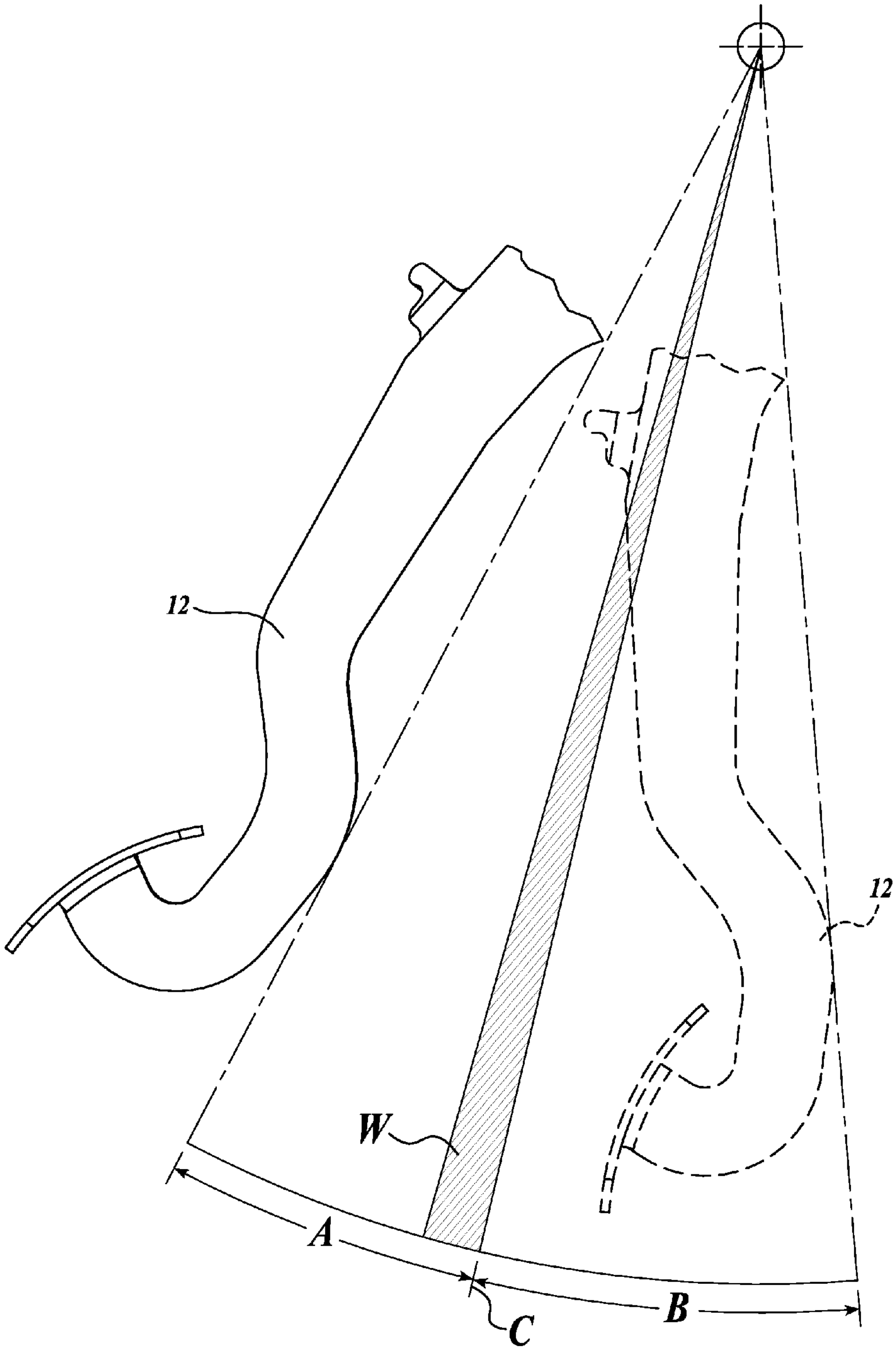
FIG. 6 is a schematic diagram of a clutch pedal showing a range of motion in accordance with aspects of the present disclosure.

Turning now to FIG. 6, there is shown a schematic diagram of the clutch pedal 12. The schematic diagram illustrates the stroke or range of travel of the clutch pedal. As shown in FIG. 6, the pedal travel of the clutch pedal 12 can be broken into segments or phases including a neutral or non-clutch brake engaged phase A and a clutch brake engaged phase B. As mention above, the transition between the neutral or non-clutch brake engaged phase A and the clutch brake engaged phase B is usually around 70% of total pedal travel, and is demarked by the letter C. However, other configurations are contemplated, and thus, the transition in other embodiments can occur before or after 70% of clutch pedal travel.

Still referring to FIG. 6, the schematic diagram also includes a clutch brake warning range or segment W that indicates to the driver that the clutch brake is about to be engaged. As will be described in detail below, devices and or assemblies are configured to provide feedback to the driver when the clutch pedal is in the clutch brake warning range W. It will be appreciated in some embodiments that the feedback can increase in intensity as the clutch pedal moves closer to the transition C between the neutral or non-clutch brake engaged phase A and the clutch brake engaged phase B. The increase in intensity can be in the form of a stronger mechanical force against pedal travel, or can be a louder audible signal, a rapidly increasing audible tone or pulse, and/or the like.

Figure 3:
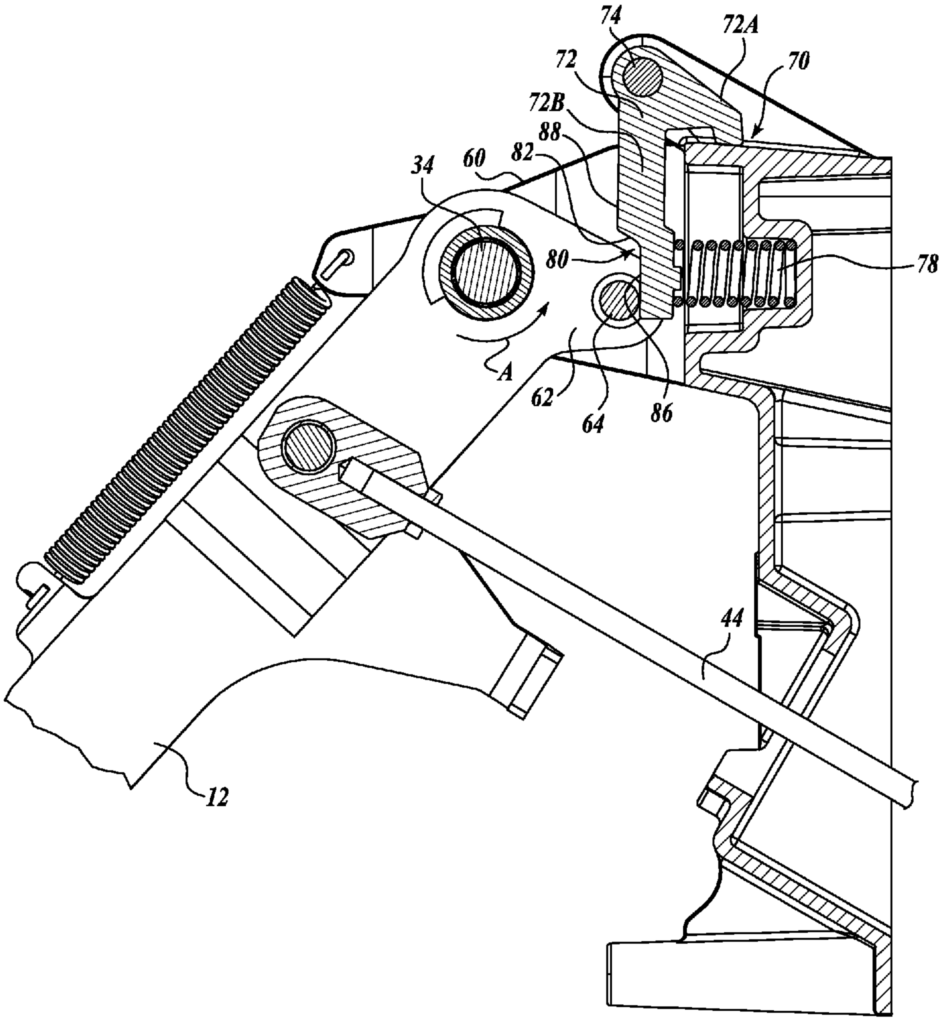
FIGS. 3-5 are partial cross-sectional views of one example of a clutch pedal assembly in accordance with aspects of the present disclosure, the clutch pedal assembly associated with one example of a clutch brake warning indicator.
Figure 4:
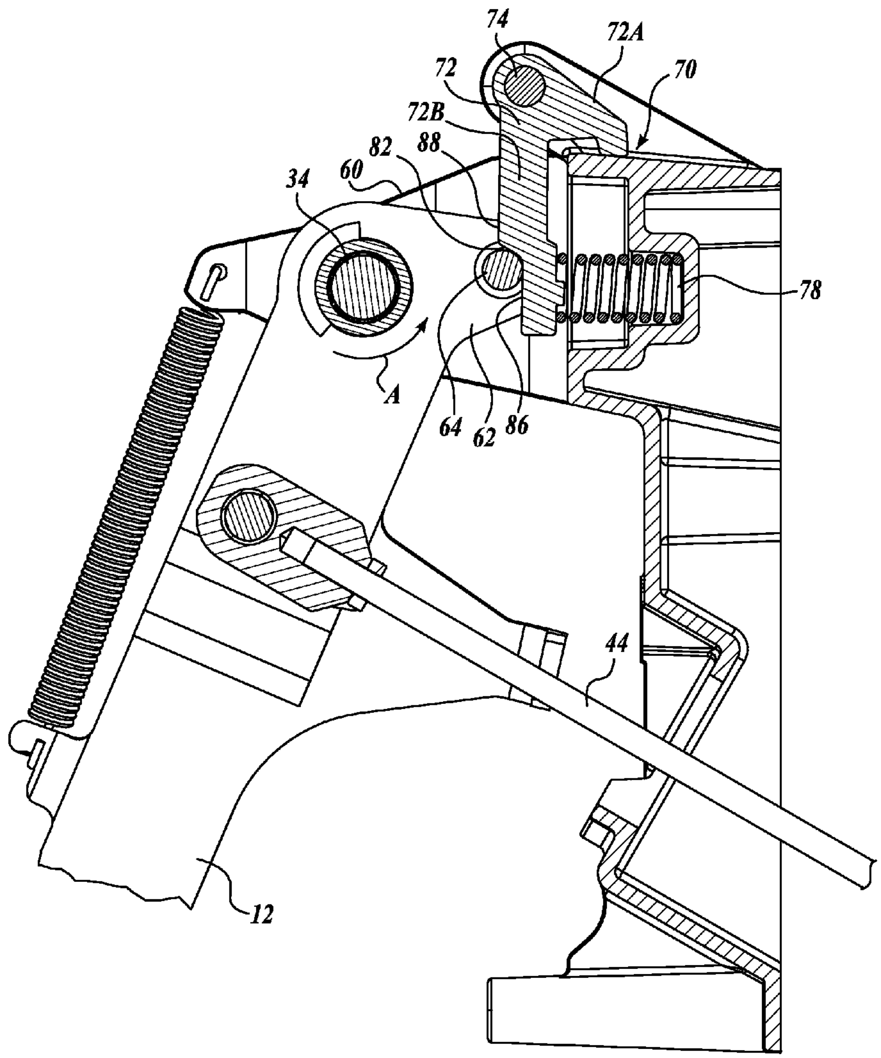
Figure 5:
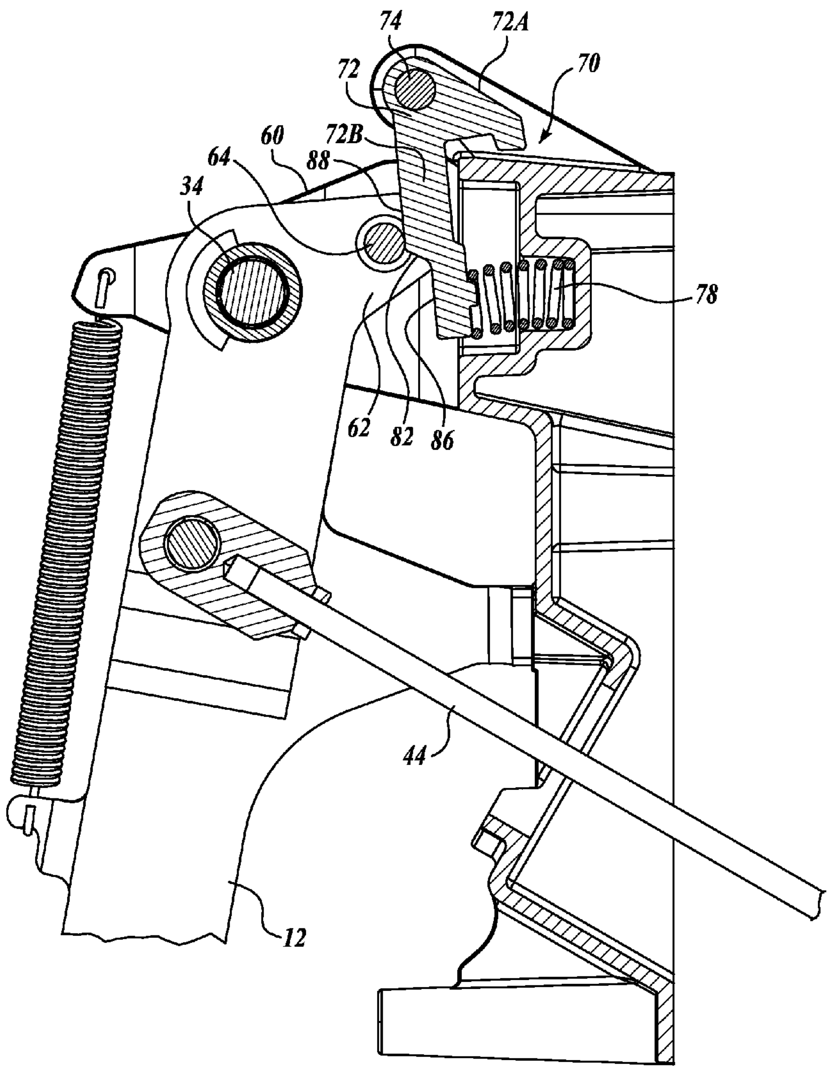

Turning now to FIGS. 3-5, there is shown one example of a clutch brake warning indicator 70 associated with the clutch pedal 12 of the clutch system 10 shown in FIGS. 1 and/or 2. As best shown in FIG. 3, the clutch pedal 12 at its proximal end is pivotally coupled to a mounting structure 60 about pivot 34. The proximal end of the clutch pedal 12 is formed with a protuberence 62 in the form of a lever arm. A pin 64 or boss is integrally formed or otherwise attached to the protuberence 62. As will be described in more detail below, the pin 64 extends parallel to the pivot axis defined by pivot 34, and is operatively associated with the clutch brake warning indicator 70. In use, the clutch pedal 12 pivots about pivot 34 between a non-depressed position, shown in FIG. 3, and a fully depressed position shown in FIG. 5. As the clutch pedal 12 travels from the non-depressed position of FIG. 3 to the fully depressed position of FIG. 5, the clutch pedal 12 travels through the phases A and B described in FIG. 6.

In the embodiment shown in FIGS. 3-5, the clutch brake warning indicator 70 includes a pivot arm 72 pivotally coupled to the mounting structure 60 about a somewhat central pivot 74. The clutch brake warning indicator 70 also includes a biasing device, such as a coil spring 78. The coil spring 78 is positioned between a wall of the mounting structure 60 and the distal end of the pivot arm segment 72B. In some embodiments, the spring 78 is preloaded to maintain the position of the spring during vehicle operation. On the side of the pivot arm segment 72B opposite the spring 78, a stepped bearing surface is formed for interfacing with the pin 64. The stepped bearing surface 80 defines a ramp 82 as the stepped bearing surface 80 transitions from a distal bearing surface portion 86 to a proximal stepped bearing surface 88. As assembled, the pin 64 of the clutch pedal 12 rests against the distal stepped bearing surface portion 86 surface in the "pedal up" or non-depressed position, as shown best in FIG. 3.

As the clutch pedal 12 rotates in the direction of arrow A about pivot 34 from the non-depressed position of FIG. 3, the pin 64 travels along the distal bearing surface portion 86 of the stepped bearing surface 80 toward the ramp 82. Because of the position of the pivot arm 72 and the pin 64 and the configuration of the stepped bearing surface 80, the pin 64 rides along the stepped bearing surface 80 as the pedal rotates in the direction of arrow A without imparting a compressing force against the spring 78. As the pin 64 continues to travel along the stepped bearing surface 80 as the clutch pedal 12 moves through non-clutch brake engaged phase A, the pin 64 contacts the ramp 82. The pin 64 contacts the ramp 82 about at the start of the clutch brake warning range W (see FIG. 6). Continued movement of the clutch pedal 12 toward phase B causes the pin 64 to ride up ramp 82 and, in turn, forces the pivot arm 72 against the spring 78.

Accordingly, it will be understood that a base level of load is required to move the clutch pedal 12 through the beginning of phase A and up until the beginning of the clutch brake warning range W. When the pivot arm 72 engages the spring 78 at the beginning of the clutch brake warning range W, an increased load is required to further depress the clutch pedal 12. This increased load, which in some embodiments is in the range of 10-30%, is clearly discernable by the operator and, thus, provides a tactile feedback signal to the operator indicating that the clutch brake is close to being activated.

The embodiment illustrated in FIGS. 3-5 is one example of the clutch brake warning indicator, although other configurations are contemplated. In some embodiments, the compression spring 78 may be suitably positioned in other locations, including in the master cylinder 38, in the slave cylinder 48, on the rod 44, 54 of the master and/or slave cylinder, on the cab floor 14, etc. For example, in an alternative embodiment, a spring is provided within the master cylinder 38. In this embodiment, the spring is engaged by the piston 42 when the clutch pedal 12 is depressed to the clutch brake warning range W. In doing so, the clutch pedal 12 translates the rod 44, thereby causing the piston 42 to move into engagement with the spring at the selective clutch pedal position. In another alternative embodiment, a spring may be provided on the rod 44 of the master cylinder 38. In this embodiment, the clutch pedal 12 is depressed until the pedal or a member that is fixed relative to the pedal 12 engages the spring at a position corresponding to the clutch brake warning range W. In yet another alternative embodiment, a spring may be provided in the slave cylinder 48 (e.g., concentrically positioned around the rod 54). As mentioned above, the slave cylinder 48 is moved by hydraulic fluid passing through hydraulic line 46 that shifts the piston 50 of the slave cylinder 48. When the piston 50 is shifted it initially moves with a first load being applied thereto until it contacts the spring at a position corresponding to the clutch brake warning range W. After the piston 50 contacts the spring further movement of the piston 50 requires an additional incremental load during clutch pedal movement through the clutch brake warning range W.

While the compression springs in these embodiments are illustrated as helical springs, other types of springs such as belleville washers, leaf springs, compression springs, or wave washers can also be used in a similar manner. Additionally, while only one spring is illustrated, it is possible that more than one of the springs may be included, if desired. For example, an embodiment with two or more springs may be configured so as to provide a non-linear opposing force. The non-linear opposing force may provide an increase in intensity against pedal travel in some embodiments. The two or more springs can be arranged concentric to one another, with one of the springs being longer than the other so as to engage a component associated with the clutch pedal earlier than the other.

In yet another embodiment, a torsion spring may be secured to the clutch pedal 12 at the pivot 34. In this embodiment, the torsion spring is secured to the pedal in such a position so that when the clutch pedal moves through the clutch brake warning range W, an increased load is imparted by the torsion spring during continued depression of the pedal.

While the clutch brake warning indicator described above is mostly of a mechanical configuration, the clutch brake warning indicator can have many other configurations. For example, in some embodiments, the clutch brake warning indicator may include a sensor, such as a proximity sensor or switch, which signals a feedback generator when the clutch pedal begins movement through the clutch brake warning range W. The feedback generator may be configured to generate signals that are tactile, such as vibration, audible, such as alarms, alerts, etc. through speakers, or visual, such as flashing lights. The sensor may be associated with the clutch pedal itself or may be associated with other components of the clutch system, such as the rod 44, the linkage 16, cylinders 38, 48, arm 18, etc.

It should be noted that for purposes of this disclosure, terminology such as "upper," "lower," "vertical," "horizontal," "fore," "aft," "inner," "outer," "front," "rear," "distal," "proximal," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An apparatus for use in a vehicle, comprising:

a clutch pedal configured to travel between a selected range of motion in order to disengage a vehicle clutch and to engage a clutch brake, wherein the selected range of motion comprising a clutch brake engaged phase and a non-clutch brake engaged phase, wherein the non-clutch brake engaged phase includes a clutch brake warning range; and a feedback generator associated with clutch pedal motion, the feedback generator configured to generate a feedback signal when the clutch pedal is positioned in the clutch brake warning range.

2. The apparatus of claim 1, wherein the feedback generator includes one or more springs configured to impart force against clutch pedal travel during the clutch brake warning range.

3. The apparatus of claim 2, wherein the feedback signal has an intensity that increases as the clutch pedal travels along the clutch brake warning range.

4. The apparatus of claim 1, wherein the clutch pedal is pivotally coupled to a support structure, and wherein the feedback generator includes a lever moveably coupled to the support structure;

a spring positioned between the lever and a part of the support structure;

a protuberance coupled to the clutch pedal, wherein the protuberance is configured and arranged to contact the lever during clutch pedal travel and to move the lever to compress the spring.

5. The apparatus of claim 4, wherein the spring is compressed as the clutch pedal travels along the clutch brake warning range.

6. An apparatus for use in a vehicle, comprising:

a clutch brake having an engaged position and a non-engaged position;

a clutch pedal configured to travel between a range of motion in order to disengage a vehicle clutch and to move the clutch brake from the non-engaged position to the engaged position, the range of motion comprising a clutch brake engaged range, wherein the clutch brake is in the engaged position, and a clutch brake non-engaged range wherein the clutch brake is in the non-engaged position, wherein the clutch brake non-engaged range includes a clutch brake warning range; and a clutch brake warning indicator associated with clutch pedal movement, the clutch brake warning indicator configured to warn a vehicle driver when the clutch pedal moves into the clutch brake warning range.

7. The apparatus of claim 6, wherein the clutch brake warning indicator includes a spring.

8. The apparatus of claim 6, wherein the clutch brake warning indicator includes a vibration signal.

9. The apparatus of claim 6, wherein the clutch brake warning indicator is configured to generate a visual or audible signal.

10. A clutch system for a vehicle, comprising:

a clutch configured to couple/decouple an engine to/from a transmission input shaft;

a clutch brake configured to retard rotation of the transmission input shaft, the clutch brake having an engaged position and a disengaged position;

a clutch pedal configured to travel between a selected range of motion in order to decouple the engine from the transmission input shaft and to move the clutch brake from the non-engaged position to the engaged position, the selected range of motion comprising a clutch brake engaged phase in which the clutch brake is in the engaged position and a clutch brake disengaged phase in which the clutch brake is in the disengaged position, wherein the clutch brake disengaged phase includes a clutch brake warning range; and a clutch brake warning indicator associated with clutch pedal motion, the clutch brake warning indicator configured to indicate to a vehicle driver when the clutch pedal moves within the clutch brake warning range.

11. The apparatus of claim 6, wherein the clutch pedal is mechanically coupled to the clutch brake.

12. The clutch system of claim 10, wherein the clutch pedal is mechanically coupled to the clutch and to the clutch brake.

* * * * *